United States Patent [19]
Davis et al.

[11] Patent Number: 6,123,643
[45] Date of Patent: Sep. 26, 2000

[54] INERTIA BRAKE CONTROL

[75] Inventors: Alan R. Davis, Plainwell; Douglas C. Gooch, Richland; Gerald E. Ganski, Lawton; Donald J. Rozsi, Marshall; Edward F. Handley, Kalamazoo, all of Mich.

[73] Assignee: Eaton Corporation, Cleveland, Ohio

[21] Appl. No.: 09/351,699

[22] Filed: Jul. 13, 1999

Related U.S. Application Data

[60] Provisional application No. 60/125,710, Mar. 23, 1999, and provisional application No. 60/125,711, Mar. 23, 1999.

[51] Int. Cl.$^7$ .................................................. B60K 41/28
[52] U.S. Cl. ......................................... 477/92; 477/98
[58] Field of Search ................................ 477/92, 98

[56] References Cited

U.S. PATENT DOCUMENTS

| | | | |
|---|---|---|---|
| 4,576,263 | 3/1986 | Lane et al. ........................... | 192/0.044 |
| 4,850,236 | 7/1989 | Braun ................................... | 74/337 |
| 5,425,689 | 6/1995 | Genise ................................. | 477/120 |
| 5,528,950 | 6/1996 | Organek et al. ..................... | 74/339 |
| 5,655,407 | 8/1997 | Dresden et al. ..................... | 74/366 |
| 5,713,445 | 2/1998 | Davis et al. ......................... | 192/35 |
| 5,960,669 | 10/1999 | Ohashi et al. ....................... | 477/98 |

*Primary Examiner*—Sherry Estremsky
*Attorney, Agent, or Firm*—Howard D. Gordon

[57] ABSTRACT

A control system/method for controlling inertia brake (19) operation in an automated mechanical transmission system (10) shifted without disengaging the master clutch (16). A value representing inertia brake temperature ($T_{SIM}$) is simulated and compared to reference values to determine if inertia brake operation is allowable.

10 Claims, 4 Drawing Sheets

INERTIA BRAKE CONTROL

RELATED APPLICATIONS

This application is related to provisional applications 60/125,710 filed Mar. 23, 1999 and 60/125,711, filed Mar. 23, 1999 assigned to EATON CORPORATION, assignee of this application.

BACKGROUND OF THE INVENTION

1. Field of the Invention

The present invention relates to controls for enhanced upshifting in an at least partially automated mechanical transmission system including an inertia brake. In particular, the control relates to inertia brake controls for an automated transmission system shifting without disengaging the master clutch. In such systems, in the absence of protective logic, the inertia brake might be subject to undue wear and/or damage.

2. Description of the Prior Art

Vehicular drivetrains including multiple-speed transmissions, usually compound transmissions, or simple transmissions coupled with multiple-speed axles, having 5, 6, 7, 9, 10, 13, 16, 18 or more forward speed ratios, are well known in the prior art, especially for heavy-duty vehicles, as may be seen by reference to U.S. Pat. Nos. 5,370,013; 5,527,237 and 4,754,665, the disclosures of which are incorporated herein by reference.

Fully and partially automated vehicular mechanical transmission systems are well known in the prior art, as may be seen by reference to U.S. Pat. Nos. 4,361,060; 4,595,986 and 4,648,290, the disclosures of which are incorporated herein by reference. U.S. Pat. No. 4,361,060 discloses logic for determining when an upshift or downshift is indicated.

Fully and partially automated mechanical transmission systems which are dynamically shifted while maintaining the master clutch engaged also are well known in the prior art, as may be seen by reference to U.S. Pat. Nos. 4,850,236; 5,435,212 and 5,735,771, the disclosures of which are incorporated herein by reference.

Vehicular inertia brakes, also called input shaft brakes and upshift brakes, also are well known in the prior art, as may be seen by reference to U.S. Pat. Nos. 5,528,950 and 5,713,445, the disclosures of which are incorporated herein by reference.

Automated transmission systems wherein input shaft and/or engine braking is utilized to complete and/or decrease the time required for upshifts are known in the prior art, as may be seen by reference to U.S. Pat. Nos. 5,425,689 and 5,655,407, the disclosures of which are incorporated herein by reference.

In a system allowing application of the inertia brake while the master clutch is engaged, an increased potential for excessive wear or damage to the inertia brake exists in the absence of protective logic for the inertia brake.

SUMMARY OF THE INVENTION

In accordance with the present invention, the drawbacks of the prior art are minimized by providing protective operational logic for utilizing an inertia brake in a transmission system shifting with the master clutch engaged, which will minimize undue wear and/or damage to the inertia brake.

The inertia brake operational logic includes temperature simulation logic and/or information from the inertia brake operator to generate a simulated inertia brake operating temperature. Operation of the inertia brake, preferably operation at various levels of retardation, is permitted only at or below certain preset, simulated temperatures. Further, feasibility of completing an upshift, or feasibility of completing an upshift within a desirable period of time, is evaluated, and the inertia brake is only used if the desired upshift is not feasible in the absence of inertia brake operation.

Accordingly, it is an object of the present invention to provide inertia brake enhanced upshifting in an automated mechanical transmission system shifting with the master clutch engaged while protecting the inertia brake from undue damage.

This and other objects and advantages of the present invention will become apparent from a reading of the description of the preferred embodiment taken in connection with the attached drawings.

DESCRIPTION OF THE PREFERRED EMBODIMENT

Figure 1:
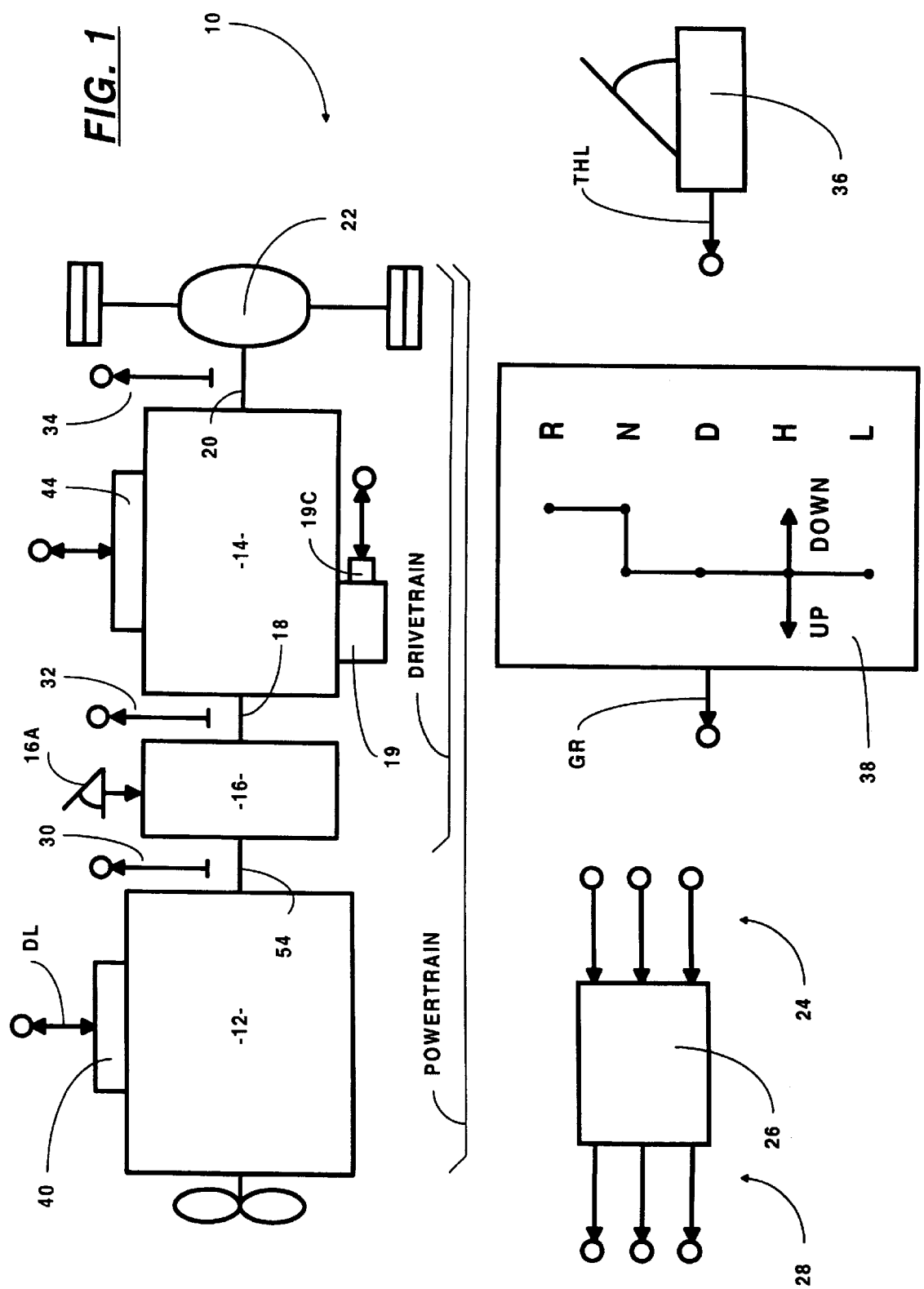
FIG. 1 is a schematic illustration of a vehicular powertrain system including an automated mechanical transmission system.

A vehicular powertrain system 10 of the type advantageously utilizing the control of the present invention may be seen by reference to FIG. 1. For purposes of illustration, system 10 is an automated mechanical transmission system including a fuel-controlled internal combustion engine 12 (such as a well-known diesel engine or the like), a multiple-speed mechanical transmission 14, and a non-positive coupling 16 for drivingly coupling the engine 12 to the transmission 14. Typically, non-positive coupling 16 will be a friction master clutch. The transmission 14 further includes an output shaft 20 for driving the vehicle drive axles 22. The drive axles may be of the single-speed or mulitple-speed type.

Transmission 14 may be of the known mechanical type utilizing positive jaw clutches to engage and disengage selected gears to shafts for changing the ratio of input shaft rotational speed (IS) to output shaft rotational speed (OS). Transmissions of this type may be seen by reference to U.S. Pat. Nos. 4,764,665; 5,385,056; 5,390,561 and 5,416,698.

Clutch 16 is controlled by a manual clutch pedal 16A and, preferably, is disengaged only for starting and stopping the vehicle (see U.S. Pat. No. 4,850,236).

System 10 may include a plurality of sensors for providing input signals 24 to a microprocessor-based control unit 26, which will process the input signals according to logic rules to generate command output signals 28 to various system actuators.

Speed sensors 30, 32 and 34 may be provided to provide input signals to the controller indicative of engine speed (ES), transmission input shaft speed (IS), and transmission output shaft speed (OS), respectively. A sensor 36 may be provided to provide an input signal indicative of the operator setting of the throttle pedal. A driver control console 38 is provided to allow the operator to select a transmission mode and to provide an input signal, GR, indicative thereof to the controller 26.

An engine controller 40, preferably microprocessor-based, may be provided for controlling fueling of the engine and for providing information to a data link, DL, indicative of the operating parameters of the engine. Preferably, the data link will comply with a known protocol, such as SAE J-1939 or the like. A transmission actuator 44 may be provided for operating the transmission 14 and for providing signals indicative of the engaged gear ratio and/or other transmission operating parameters. Engaged ratio also may be calculated by comparing the rotational speeds of the input and output shafts.

As used in this application, and as commonly used in the vehicular industry, the term "powertrain" will refer to the engine 12, coupling 16, transmission 14 and drive axles 22, while the term "drivetrain" will refer to the coupling 16, the transmission 14 and the axles 22.

System 10 also includes an inertia brake, also called an upshift brake 19, utilized to retard the rotational speed of input shaft 18 to make certain upshifts feasible and/or more rapidly accomplished. The upshift brake, which preferably is actuable at two or more levels of retardation, includes an inertia brake actuator 19C, which is controlled by command output signals from ECU 48.

Inertia brakes are typically relatively low-capacity friction devices operated automatically or by overtravel of the clutch pedal. Examples of inertia brakes may be seen by reference to U.S. Pat. Nos. 5,528,950 and 5,713,445.

Figure 2:
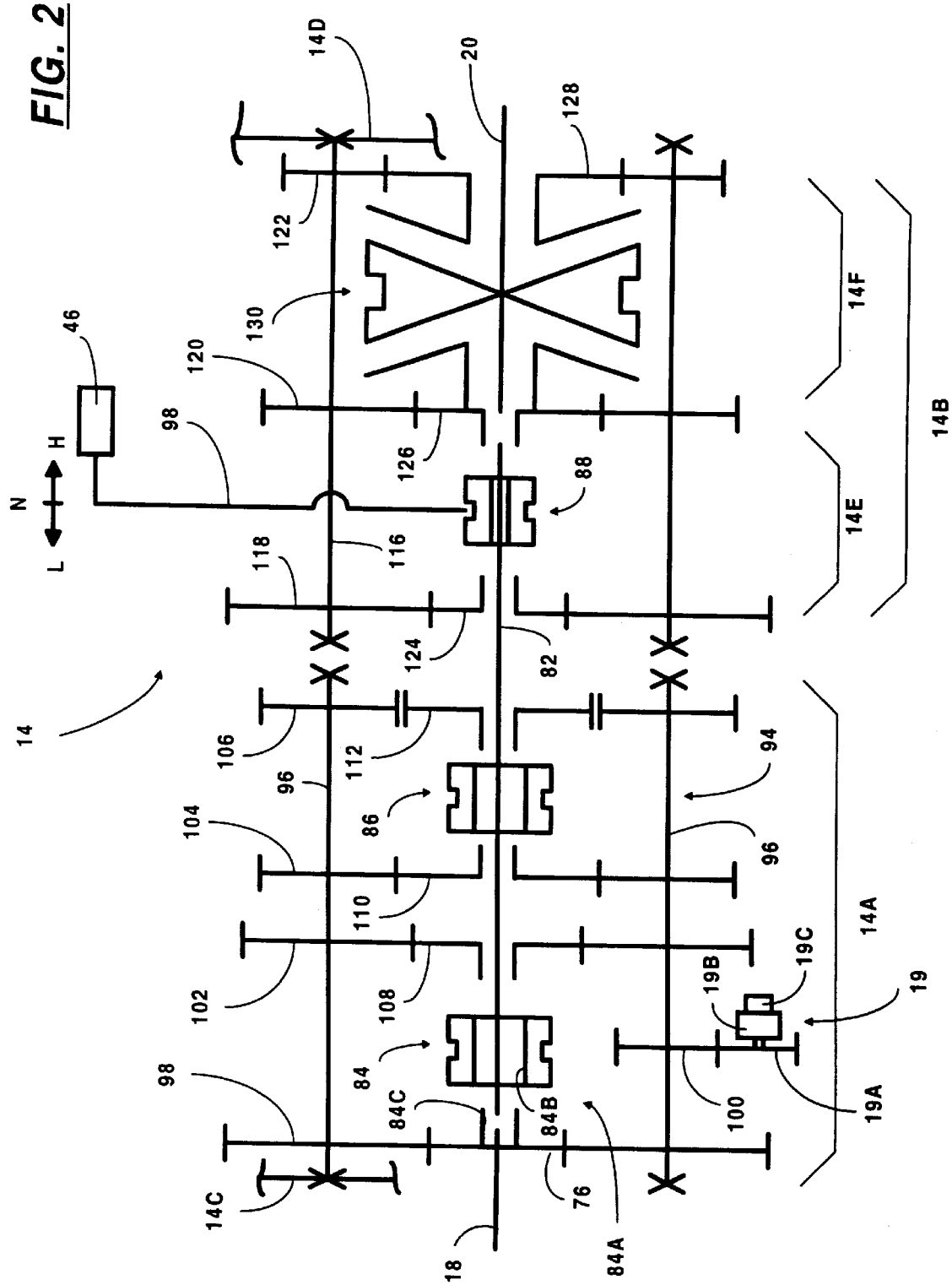
FIG. 2 is a schematic illustration of the transmission illustrated in FIG. 1.

The detailed structure of the 10-forward-speed, combined range-and-splitter-type synchronized transmission 14 is schematically illustrated in FIG. 2. Transmissions of this general type are disclosed in aforementioned U.S. Pat. Nos. 5,000,060; 5,370,013 and 5,390,561.

Transmission 14 includes a non-synchronized main section 14A and an auxiliary section 14B, both contained within a housing including a forward end wall 14C, which may be defined by the clutch housing, and a rearward end wall 14D, but (in this particular embodiment) not an intermediate wall.

Input shaft 18 carries input gear 76 fixed for rotation therewith. The mainshaft 82 carries synchronized mainshaft clutches 84 and 86, and the mainshaft splitter clutch 88. Shift forks (not shown) are provided for shifting clutches 84 and 86 and are controlled by shift lever 31 acting on the shift assembly 32. Mainshaft 82 is independently rotatable relative to input shaft 26 and output shaft 20 and preferably is free for limited radial movement relative thereto.

As is well known, clutches 84 and 86 are double-acting devices movable fore and aft from the centered positions thereof to engage a selected main section ratio. By way of example, a first jaw clutch 84A is defined by a first array of clutch teeth 84B carried by the leftward end of clutch member 84, which are engageable with a second array of clutch teeth 84C carried by input gear 78.

The main section 14A includes two substantially identical main section countershaft assemblies 94, each comprising a main section countershaft 96 carrying countershaft gears 98, 100, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. Countershaft gear 100 is provided for driving a PTO or the like.

The auxiliary section 14B of transmission 14 includes a splitter section 14E and a range section 14F. Auxiliary section 14B includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive control signals from ECU 26 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 14B is a three-layer auxiliary section of the combined range and splitter type providing four selectable speeds or drive ratios between the input (mainshaft 82) and output (output shaft 20) thereof. The main section 14A provides a reverse and three potentially selectable forward speeds. However, one of the selectable main section forward gear ratios, the low-speed gear ratios associated with mainshaft gear 110, is not utilized in the high range. Thus, transmission 14 is properly designated as a "(2+1)×(2×2)" type transmission providing nine or ten selectable forward speeds, depending upon the desirability and practicality of splitting the low gear ratio.

Engine fueling manipulations to relieve torque lock without requiring clutch disengagement and to synchronize gear engagement are described in greater detail in U.S. Pat. Nos. 4,850,236 and 5,105,357.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

The clutch 88 is moved by a shift fork 98 attached to a piston rod of the piston actuator assembly 46. Actuator assembly 46 may be a conventional three-position actuator (see U.S. Pat. No. 5,054,591, the disclosure of which is incorporated herein by reference) or an actuator of the type illustrated in U.S. Pat. No. 5,682,790 or 5,661,998 (the disclosures of which are incorporated herein by reference), wherein pulse width modulation of a selectively pressurized and exhausted chamber may be used to achieve the three splitter positions (L, N, H) of the shift fork.

Preferably, the splitter clutch actuator 44 will be capable of applying a variable force, such as by pulse width modulation, of supply pressure. A force lesser than full force may be utilized when disengaging and/or when synchronous conditions cannot be verified.

The inertia brake assembly 19 may include a gear 19A which is constantly meshed with gear 100 and a selectively, variably applied friction retarder 19B for retarding the rotation of gear 19A and, thus, of all gearing associated with input shaft 18. Preferably, all or a portion of the inertia brake assembly will be in the transmission lubrication sump.

In a preferred embodiment, inertia brake 19 may be applied to retard the rotational speed of engine 12, clutch 14, input shaft 18, and all of the gearing associated therewith, at a first rate of about 850 RPM/second or a second, higher rate of about 1250 RPM/second.

As the inertia brake is operated with master clutch engaged, it may be exposed to considerable heat build-up and wear, especially if utilized when not required, or more frequently and/or at a higher level than is appropriate.

According to the present invention, the inertia brake 19 is protected from certain heat build-up and undue wear by utilizing the brake 19 only if an upshift is not feasible within a preselected time in the absence of the retarding effect of the brake, and then the higher level of retardation is only used if the lower level of retardation will not allow the upshift to be completed within the predetermined period of time. Logic for determining the feasibility of upshifts with variable degrees of engine speed retardation may be seen by reference to U.S. Pat. Nos. 5,335,566; 5,425,689 and 5,655,407. Typically, larger ratio steps will require a greater rate of retardation than will smaller ratio steps.

To further protect the brake 19, the control logic will maintain a simulated value, $T_{SIM}$, for the temperature of the brake, and will allow actuation at the lower level of retardation only if the simulated value is less than a first reference value ($T_{SIM}<REF_1$?), and will allow actuation at the higher level of retardation only if the simulated value is less than a second reference value ($T_{SIM}<REF_2$?), the first reference value being greater than the second reference value ($REF_1>REF_2$).

An example of generating a simulated temperature value of a friction device as a control parameter therefor may be seen by reference to U.S. Pat. No. 4,576,263. By way of example, in one embodiment of the invention, the lower level of retardation will be prohibited if simulated brake temperature is greater than 124° C., while the higher level of retardation will be prohibited if simulated brake temperature is greater than 90° C.

By way of example, the simulated value of inertia brake temperature ($T_{SIM}$) may be determined as follows:

(a) Add 53° C. to transmission sump temperature ($T_{SUMP}$) for every 850 RPM/second shift and 86° C. to transmission sump temperature for every 1250 RPM/second shift.

(b) The temperature rise for each shift takes about one second. Decrement temperature 22° C. for the first second after the shift and 4° C./second thereafter down to transmission sump temperature ($T_{SUMP}$). (Alternatively, the temperature can be decremented at just one rate, which would be between 22° C./second and 4°/second.)

(c) Transmission sump temperature ($T_{SUMP}$) is estimated using resistance of a coil (such as the solenoid actuation coil of the inertia brake) exposed to transmission oil. If coil resistance is known, its temperature can be calculated according to the following equation for copper wire:

$$T2=(R2 \div R1)*(234+T1)-234 \text{ where T is in degrees Centigrade and R is in Ohms}$$

The room temperature resistance is known ($T_1$ and $R_1$). $R_2$ is calculated by measuring current through the coil with a known voltage and using the relationship R=V/I where V equals applied voltage and I equals resulting current in amps. The coil logic for estimating sump temperature may be eliminated by assuming a sump temperature (about 93° C.).

The above values, of course, are empirically determined for a specific configuration of system.

Figure 3A:
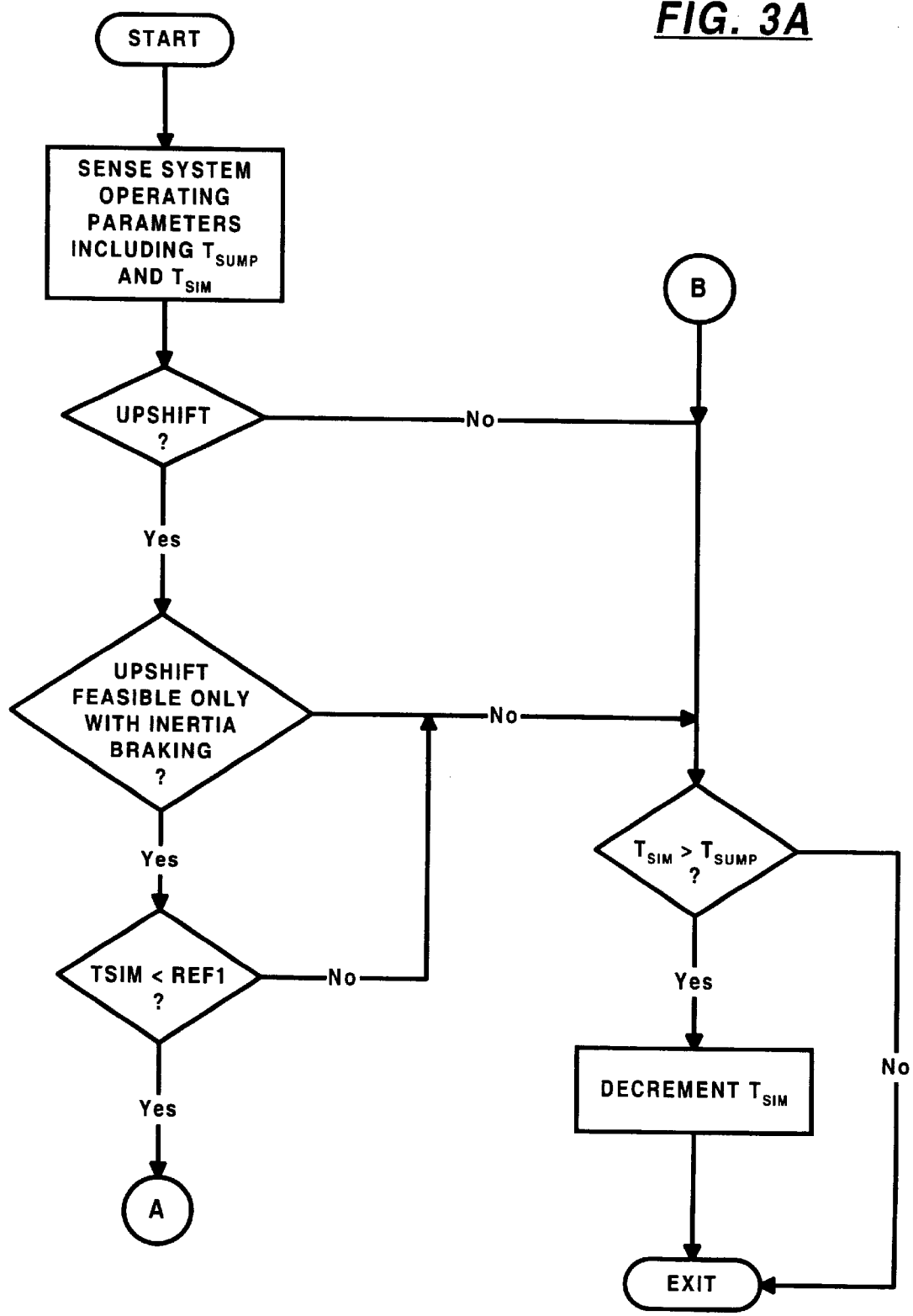
FIGS. 3A and 3B are flow chart representations of the control of the present invention.
Figure 3B:
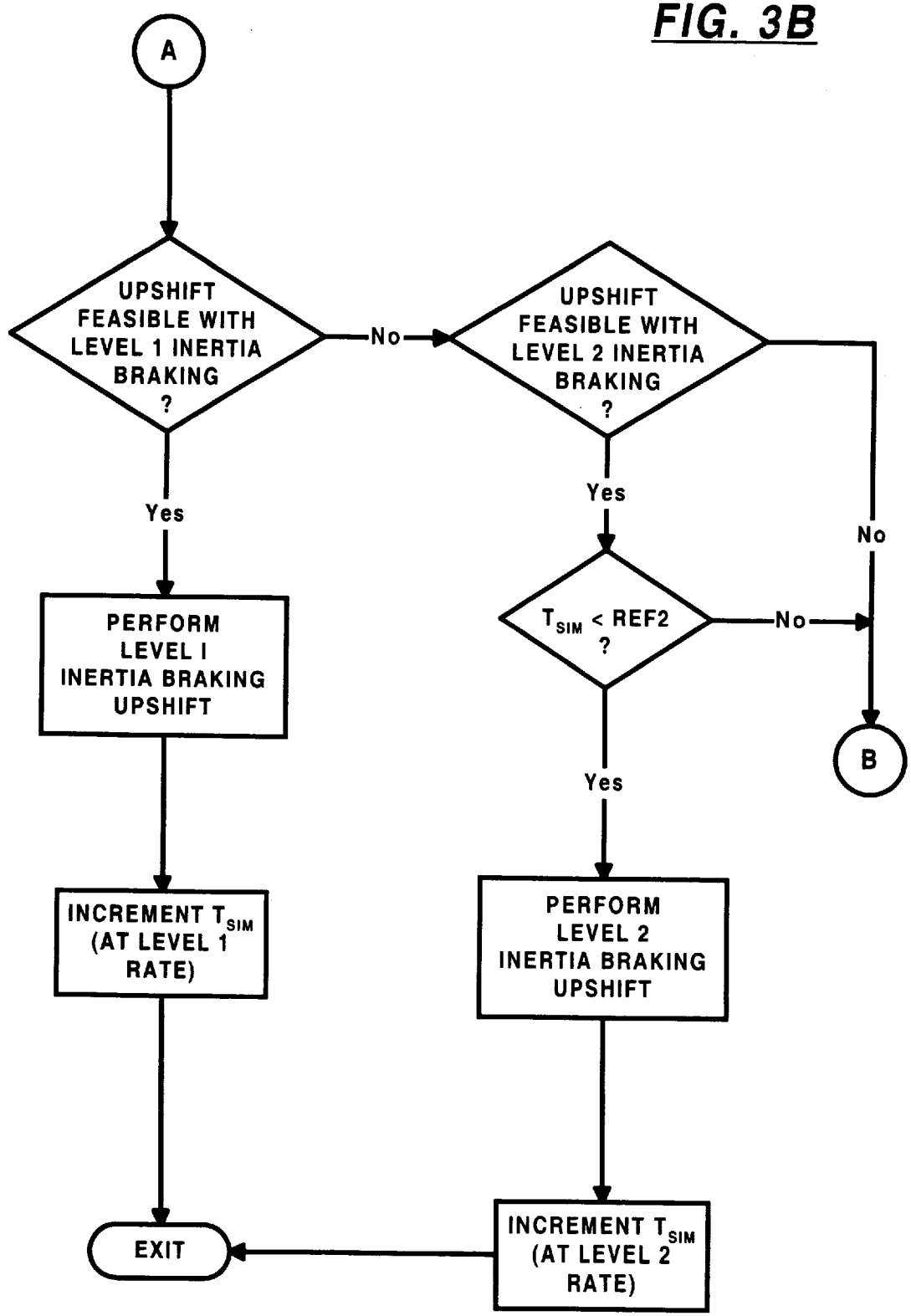

The control of the present invention may be seen in flow chart format by reference to FIG. 3.

Although the present invention has been described with a certain degree of particularity, it is understood that various modifications are possible without departing from the spirit and scope of the invention as hereinafter claimed.

We claim:

1. A method for controlling automatic upshifting in a vehicular automated mechanical transmission system (10) for a vehicle comprising a fuel-controlled engine (12), a multiple-speed mechanical transmission (14), having an input shaft (18) coupled to said engine by a connecting member (16), an inertia brake (19) effective, when activated, to retard rotational speed of said input shaft, and a controller (26) for receiving input signals (24) including one or more of signals indicative of engine speed (ES), engaged gear ratio (GR) and vehicle speed (OS), and to process said input signals in accordance with with logic rules to issue command output signals (28) to transmission system actuators including a transmission actuator (44) effective to shift said transmission, and an inertia brake actuator (19C) effective to actuate said inertia brake, said method including:

(a) determining if an upshift from a currently engaged ratio (GR) is indicated;

(b) if an upshift from a currently engaged ratio (GR) is indicated:

(i) determining if the indicated upshift is feasible without operation of the inertia brake;

(ii) if the indicated upshift is feasible without operation of the inertia brake, performing the indicated upshift without operating the inertia brake;

(iii) if the indicated upshift is not feasible without operation of the inertia brake, determining if the indicated upshift is feasible with operation of the inertia brake, and (iv) if the indicated upshift is not feasible with operation of the inertia brake, preventing initiation of the indicated upshift;

(c) if the indicated upshift is feasible with operation of the inertia brake but is not feasible without operation of the inertia brake, in sequence:

(i) determining a value ($T_{SIM}$) indicative of a simulated temperature of the inertia brake;

(ii) comparing the value to a reference and, if the value exceeds the reference, preventing initiation of the indicated upshift and, if the reference exceeds the value, performing the indicated upshift with operation of the inertia brake.

2. The method of claim 1 wherein said connecting member (16) is a master friction clutch and said transmission is shifted without disengaging said master clutch.

3. The method of claim 1 wherein said inertia brake may be activated at a first, lower level of retardation and at a second, higher level of retardation.

4. The method of claim 1 wherein step (c)(i) comprises incrementing the value when the inertia brake is engaged and decrementing the value when the inertia brake is not engaged.

5. A method for controlling automatic upshifting in a vehicular automated mechanical transmission system (10) for a vehicle comprising a fuel-controlled engine (12), a multiple-speed mechanical transmission (14), having an input shaft (18) coupled to said engine by a connecting member (16), an inertia brake (19) effective, when activated, to retard rotational speed of said input shaft, and a controller (26) for receiving input signals (24) including one or more of signals indicative of engine speed (ES), engaged gear ratio (GR) and vehicle speed (OS), and to process said input signals in accordance with with logic rules to issue command output signals (28) to transmission system actuators including a transmission actuator (44) effective to shift said transmission, and an inertia brake actuator (19C) effective to actuate said inertia brake at a first, lower level of retardation and a second, higher level of retardation, said method including:

(a) determining if an upshift from a currently engaged ratio (GR) is indicated;

(b) if an upshift from a currently engaged ratio (GR) is indicated:
 (i) determining if the indicated upshift is feasible without operation of the inertia brake;
 (ii) if the indicated upshift is feasible without operation of the inertia brake, performing the indicated upshift without operating the inertia brake;
 (iii) if the indicated upshift is not feasible without operation of the inertia brake, determining if the indicated upshift is feasible with operation of the inertia brake;
 (iv) if the indicated upshift is not feasible with operation of the inertia brake at the first level of retardation, determining if the indicated upshift is feasible with operation of the inertia brake at the second level of retardation; and
 (v) if the indicated upshift is not feasible at the second level of retardation, preventing initiation of the indicated upshift;

(c) if the indicated upshift is feasible with operation of the inertia brake at said first level of retardation but is not feasible without operation of the inertia brake, in sequence:
 (i) determining a value ($T_{SIM}$) indicative of a simulated temperature of the inertia brake;
 (ii) comparing the value to a first reference and, if the value exceeds the reference, preventing initiation of the indicated upshift and, if the reference exceeds the value, performing the indicated upshift with operation of the inertia brake;

(d) if the indicated upshift is feasible with operation of the inertia brake at the second level of retardation but is not feasible with operation of the inertia brake at the first level of retardation, in sequence:
 (i) determining a value ($T_{SIM}$) indicative of a simulated temperature of the inertia brake;
 (ii) comparing the value to a second reference, said second reference being smaller than said first reference ($REF_1 > REF_2$) and, if the value exceeds the second reference, preventing initiation of the indicated upshift and, if the second reference exceeds the value, performing the indicated upshift with operation of the inertia brake at said second level of retardation.

6. The method of claim 5 wherein said connecting member (16) is a master friction clutch and said transmission is shifted without disengaging said master clutch.

7. A system for controlling automatic upshifting in a vehicular automated mechanical transmission system (10) for a vehicle comprising a fuel-controlled engine (12), a multiple-speed mechanical transmission (14), having an input shaft (18) coupled to said engine by a connecting member (16), an inertia brake (19) effective, when activated, to retard rotational speed of said input shaft, and a controller (26) for receiving input signals (24) including one or more of signals indicative of engine speed (ES), engaged gear ratio (GR) and vehicle speed (OS), and to process said input signals in accordance with with logic rules to issue command output signals (28) to transmission system actuators including a transmission actuator (52) effective to shift said transmission, and an inertia brake actuator (19C) effective to actuate said inertia brake, said system characterized by said logic rules, including rules for:

(a) determining if an upshift from a currently engaged ratio (GR) is indicated;

(b) if an upshift from a currently engaged ratio (GR) is indicated:
 (i) determining if the indicated upshift is feasible without operation of the inertia brake;
 (ii) if the indicated upshift is feasible without operation of the inertia brake, performing the indicated upshift without operating the inertia brake;
 (iii) if the indicated upshift is not feasible without operation of the inertia brake, determining if the indicated upshift is feasible with operation of the inertia brake, and
 (iv) if the indicated upshift is not feasible with operation of the inertia brake, preventing initiation of the indicated upshift;

(c) if the indicated upshift is feasible with operation of the inertia brake but is not feasible without operation of the inertia brake, in sequence:
 (i) determining a value ($T_{SIM}$) indicative of a simulated temperature of the inertia brake;
 (ii) comparing the value to a reference and, if the value exceeds the reference, preventing initiation of the indicated upshift and, if the reference exceeds the value, performing the indicated upshift with operation of the inertia brake.

8. The system of claim 7 wherein said connecting member (16) is a master friction clutch and said transmission is shifted without disengaging said master clutch.

9. The system of claim 7 wherein said inertia brake may be activated at a first, lower level of retardation and at a second, higher level of retardation.

10. The system of claim 7 wherein step (c)(i) comprises incrementing the value when the inertia brake is engaged and decrementing the value when the inertia brake is not engaged.

* * * * *